(12) United States Patent
Lin (10) Patent No.: US 10,326,809 B2
(45) Date of Patent: *Jun. 18, 2019

(54) INTERACTIVE SYSTEM FOR VIRTUAL CINEMA AND METHOD

(71) Applicant: NANNING FUGUI PRECISION INDUSTRIAL CO., LTD., Nanning (CN)

(72) Inventor: Po-Yu Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,037

(22) Filed: Jun. 7, 2018

(65) Prior Publication Data

US 2018/0288113 A1 Oct. 4, 2018

Related U.S. Application Data

(63) Continuation-in-part of application No. 15/428,223, filed on Feb. 9, 2017, now Pat. No. 10,045,086.

(51) Int. Cl.

| | | |
|---|---|---|
| *G06F 3/00* | (2006.01) |
| *G06F 13/00* | (2006.01) |
| *H04N 5/445* | (2011.01) |
| *H04N 7/16* | (2011.01) |
| *H04L 29/06* | (2006.01) |
| *G06F 3/01* | (2006.01) |
| *G06T 11/60* | (2006.01) |
| *H04L 12/18* | (2006.01) |
| *G06Q 50/00* | (2012.01) |
| *H04L 29/08* | (2006.01) |

(52) U.S. Cl.
CPC ............ *H04L 65/403* (2013.01); *G06F 3/011* (2013.01); *G06Q 50/01* (2013.01); *G06T 11/60* (2013.01); *H04L 12/1818* (2013.01); *H04L 12/1822* (2013.01); *H04L 65/4015* (2013.01); *H04L 67/306* (2013.01)

(58) Field of Classification Search
CPC ............. H04N 21/4788; H04N 21/239; H04N 21/26291; H04N 21/42203; H04N 21/4312; H04N 21/4882; H04N 21/6143; H04N 21/84; H04N 21/845; G06F 3/012; G10L 15/22; G10L 2015/223
See application file for complete search history.

(56) References Cited

U.S. PATENT DOCUMENTS

| | | | |
|---|---|---|---|
| 10,045,086 B1 * | 8/2018 | Lin | ............. H04N 21/4788 |
| 2005/0234750 A1 * | 10/2005 | Attebury | ............. G06Q 10/02 705/5 |
| 2011/0225519 A1 * | 9/2011 | Goldman | ............. G06F 3/0481 715/757 |

(Continued)

*Primary Examiner* — Kyu Chae
(74) *Attorney, Agent, or Firm* — ScienBiziP, P.C.

(57) ABSTRACT

A virtual cinema interactive system includes a server and at least two user terminals. The user terminals communicate with the server. An inviter can invite his friends to watch film together on a virtual cinema displayed on each user terminal, and distribution of virtual cinema seating, talking between film watchers, and film watcher reactions to the film can be recognized and facilitated. A virtual cinema interactive method is also disclosed.

18 Claims, 7 Drawing Sheets

(56) References Cited

U.S. PATENT DOCUMENTS

| | | | | |
|---|---|---|---|---|
| 2013/0027296 A1* | 1/2013 | Klein | ................ | G06F 3/017 |
| | | | | 345/156 |
| 2014/0007170 A1* | 1/2014 | Klappert | ............ | G06Q 50/01 |
| | | | | 725/97 |
| 2014/0229390 A1* | 8/2014 | Morris | ............ | G06Q 10/103 |
| | | | | 705/302 |
| 2015/0244981 A1* | 8/2015 | Johnson | ............ | H04N 7/15 |
| | | | | 348/14.07 |
| 2015/0341695 A1* | 11/2015 | Pattan | ............ | H04L 12/1822 |
| | | | | 725/86 |
| 2017/0041658 A1* | 2/2017 | Mattingly | ............ | G06Q 10/10 |

* cited by examiner

| 12 | 6 | 3 | 5 | 11 |
|----|---|------|---|----|
| 12 | 2 | Myself | 1 | 9 |
| 12 | 8 | 4 | 7 | 13 |

FIG. 3

| Inviter | Invitee | | | | |
|---------|---------|---|---|---|---|
|         | Best friend class | | | General friend class | |
| A | B3 | C4 | D5 | 12 | F2 |

FIG. 4

|    | B3 | F2 |
|----|----|----|
| C4 | A  | D5 |
|    | E3 |    |

FIG. 5

| Inviter | Invitee | | | | |
|---|---|---|---|---|---|
| | Best friend class | | General friend class | | Friends who invite other people | Friends who do not invite other pepole |
| A | B3 | C4 | D5 | E3 | F2 | C4, E3 | D5, B3, F2 |
| B3 | G7 | H3 | | I5 | | G7, I5 | H3 |
| D5 | J5 | | | K4 | | J5, K4 | |
| F2 | L9 | M7 | | N3 | | L9, M7, N3 | |
| H3 | O3 | P6 | | | | O3, P6 | |

FIG. 6

| K4 | D5 | J5 | M7 | |
|---|---|---|---|---|
| K3 | A | C4 | F2 | L9 |
| I5 | B3 | G7 | N3 | |
| O3 | H3 | P6 | | |

FIG. 7

Screen

| | | | | | | | | | | | | | | | | | | | |
|---|---|---|---|---|---|---|---|---|---|---|---|---|---|---|---|---|---|---|---|
| | | | | | | | 48 | 47 | 46 | 45 | 46 | 45 | 44 | 43 | 42 | 41 | 40 | | 17 |
| | | | | | | | 49 | 24 | 23 | 22 | 23 | 22 | 21 | 20 | 19 | 18 | 39 | | 18 |
| | | | | | | | 50 | 25 | 8 | 7 | 8 | 7 | 6 | 5 | 4 | 17 | 38 | | 19 |
| | | | | | | | 51 | 26 | 9 | 1 | 48 | 47 | 46 | 45 | 44 | 43 | 42 | 41 | 40 | 20 |
| | | | | | | | 52 | 27 | 10 | 11 | 49 | 24 | 23 | 22 | 21 | 20 | 19 | 18 | 39 | 21 |
| | | | | | | | 53 | 28 | 29 | 30 | 50 | 25 | 8 | 7 | 6 | 5 | 4 | 17 | 38 | 22 |
| | | | | | | | 54 | 55 | 56 | 57 | 51 | 26 | 9 | 1 | 0 | 2 | 3 | 16 | 37 | 23 |
| | | | | | | | | | | | 52 | 27 | 10 | 11 | 12 | 13 | 14 | 15 | 36 | 24 |
| | | | | | | | | | | | 53 | 28 | 29 | 30 | 31 | 32 | 33 | 34 | 35 | 25 |
| | | | | | | | | | | | 54 | 55 | 56 | 57 | 58 | 59 | 60 | 61 | 62 | 26 |

INTERACTIVE SYSTEM FOR VIRTUAL CINEMA AND METHOD

CROSS-REFERENCE TO RELATED APPLICATIONS

The application is a continuation-in-part of and claims priority under 35 U.S.C. § 120 to U.S. application Ser. No. 15/428,223, filed Feb. 9, 2017, the contents of which are incorporated by reference herein.

FIELD

The subject matter herein generally relates to virtual cinemas.

BACKGROUND

Virtual reality technology has advanced substantially and offers virtual interaction for products and services to a wide variety of audiences. For example, virtual reality devices can display virtual cinemas to a user through a headset for the user to watch films and videos on a virtual cinema. However, when the user watches films or videos through the virtual reality device, the user does not have the option to invite friends to watch the film or video.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the s described herein. However, it will be understood by those of ordinary skill in the art that the s described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the s described herein.

A definition that applies throughout this disclosure will now be presented.

The term "comprising" means "including, but not necessarily limited to"; it specifically indicates open-ended inclusion or membership in a so-described combination, group, series, and the like.

Figure 1:
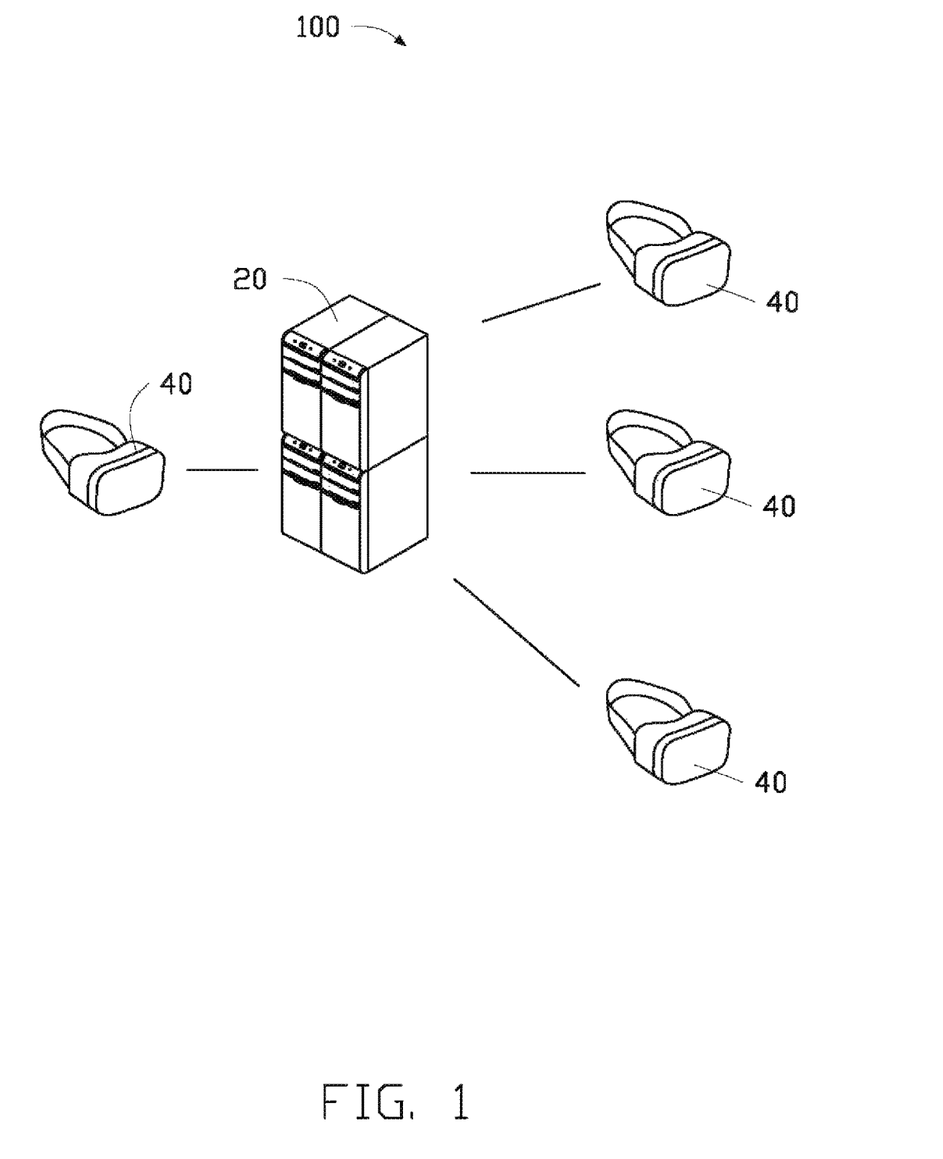
FIG. 1 is a schematic diagram of an exemplary embodiment of a virtual cinema interactive system.
Figure 2:
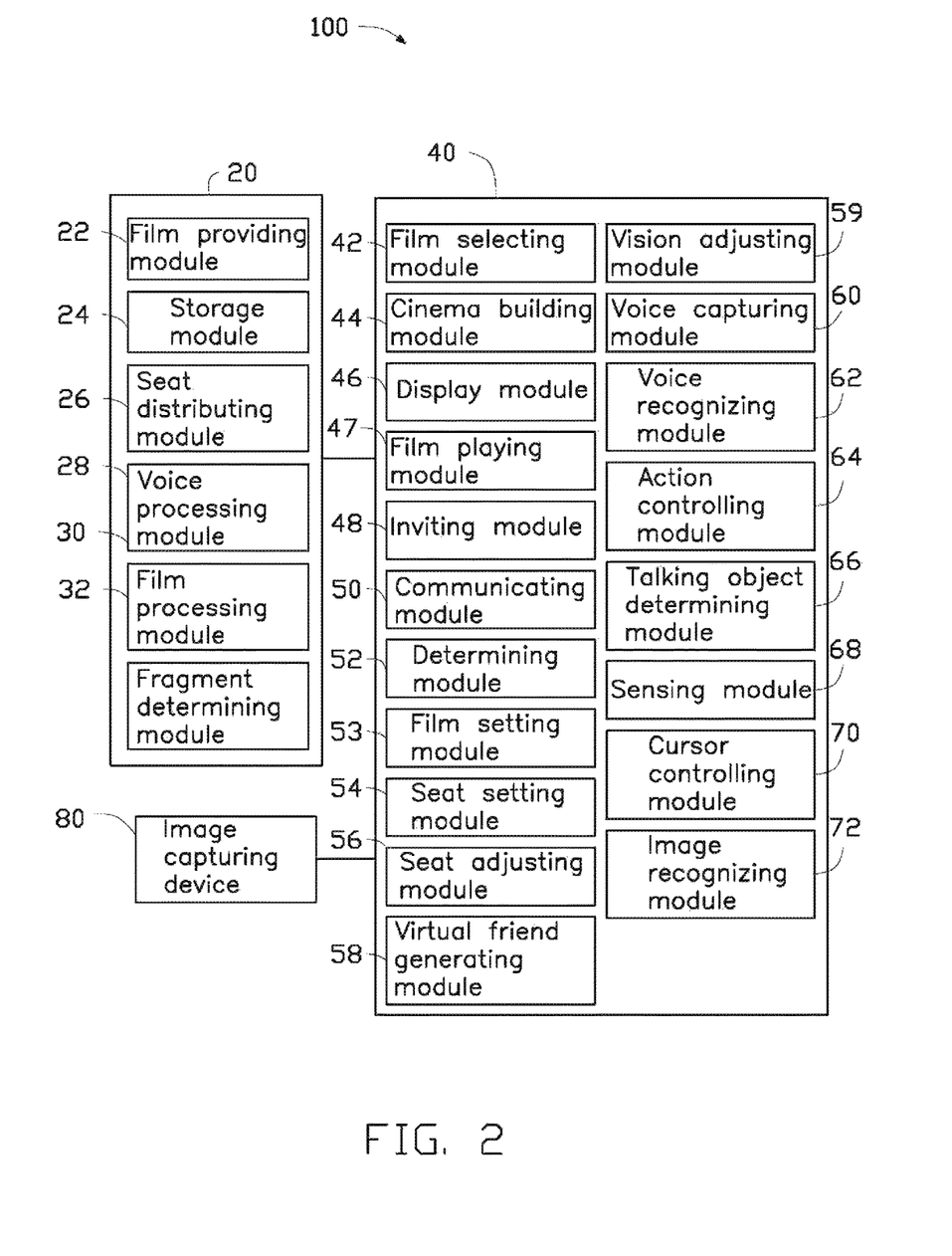
FIG. 2 is a block diagram of the exemplary virtual cinema interactive system of FIG. 1.

FIGS. 1-2 illustrate an exemplary embodiment of a virtual cinema interactive system 100 which includes a server 20 and a number of user terminals 40. The virtual cinema interactive system 100 provides a virtual cinema, and the users can watch a film together and interact with each other while watching the film on the virtual cinema. A number of modules are executed in the server 20 and the user terminal 40, each module containing a number of programs. The modules include a film providing module 22, a film selecting module 42, a cinema building module 44, a display module 46, a film playing module 47, an inviting module 48, a communicating module 50, a determining module 52, a film setting module 53, a storage module 24, a seat setting module 54, a seat distributing module 26, a seat adjusting module 56, a virtual friend generating module 58, and a vision adjusting module 59.

The film providing module 22 provides film information and film data. The film information includes film name and film introduction. The film data includes film audio and video. The film selecting module 42 provides an interface for an inviter to select the film. The cinema building module 44 builds the virtual cinema. The virtual cinema includes a film screen and a number of seats. The display module 46 displays the virtual cinema. In response to selection of a play film operation, the film playing module 47 plays the selected film on the film screen.

The inviting module 48 provides a friend invitation interface for the inviter. The inviter can then select friends, and the inviter and friends can watch the film together. The communicating module 50 transmits information of the inviter and the friends invited by the user (hereinafter called "invitee") to the server 20. The server 20 transmits the information of the inviter and the invitation to watch a film to the invitee. In response to an invitee's operation (e.g. accept invitation or decline invitation), the determining module 52 determines whether the invitation of the inviter is accepted.

The communicating module 50 further transmits the information of the selected film to the server 20. The server 20 further transmits the information of the selected film to the invitee. Thus, the invitee can decide to accept or decline the invitation of the inviter based on the selected film.

The film setting module 53 provides a film setting interface for the inviter to set a playing time of the selected film. The playing time may be one hour from now or right now. The server 20 transmits the playing time of the selected film to the invitee. Thus, the invitee can decide to accept or decline the invitation of the inviter regarding the playing time of the selected film.

The seat setting module 54 provides a seat setting interface for the inviter. The inviter can then define a friend class among the invitees, and the defined friend class determines priority seating assignments for each invitee in the virtual cinema. The storage module 24 stores the number of chat communications made by the invitee to the inviter. According to the invitee, the friend class of each invitee, the number of chat communications, the priority of seats, and a seat distribution regulation, the seat distributing module 26 can determine how to distribute seats amongst the invitees. The friend class includes a best friend class and a general friend class. The seat adjusting module 56 provides a seat adjusting interface for the invitee to adjust the distribution and number of seats. Thus, when the invitee is not satisfied with the distributed seat, the invitee can change the seat. In the virtual reality, the virtual friend generating module 58 generates a portrait of the friend positioned in the distributed seat.

After accepting the invitation, the invitee also can invite his friends through the inviting module 48 and set friend classes and his priority of seats in the virtual cinema, through the seat setting module 54.

Figure 3:
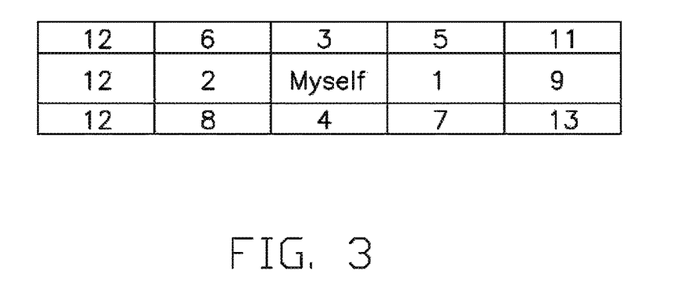
FIG. 3 is a schematic diagram of a priority of seats in the system of FIG. 1.

When all of the invitees do not invite a friend to watch the film, the seat distribution regulation is that of preferential seat distribution to the invitee with a higher friend class ranking. When the friend class rankings are the same, preferentially seat distribution assigns seats to the invitee having communicated the most with the inviter. Referring to FIG. 3, the inviter setting the priority of seats in the virtual cinema is that the first seat on the left of the inviter seat is number one seat, the first seat on the right of the inviter seat is number two seat, the second seat on the left of the inviter seat is number three seat, the second seat on the right of the inviter seat is number four seat, the first seat in front of the inviter seat is number five seat, and so on.

Figure 4:
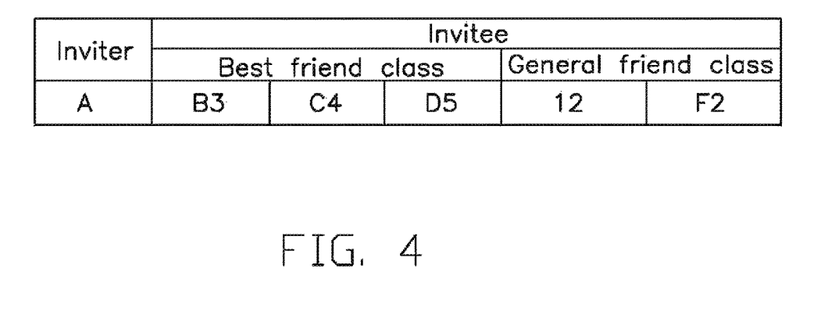
FIG. 4 is a schematic diagram of information of invitees in the system of FIG. 1, according to a first exemplary embodiment.

Referring to FIG. 4, the inviter A invites invitees B3, C4, D5, E3, and F2 to watch film. The letter in the B3, C4, D5, E3, and F2 represents invitee identity. The number in the B3, C4, D5, E3, and F2 represent number of chat communication made by the invitee o the inviter. The invitees B3, C4, D5 are best friend class. The invitees E3 and F2 are general friend class. When distributing seats, the invitees B3, C4, D5 are given preferentially distributed seats, and according to number of chat communication made by the invitee to the inviter, seats are distributed in turn to the invitees D5, C4, B3. Then, according to number of chat communication, seats are distributed in turn to general friends E3, and F2. Thus, the B3, C4, D5, E3, and F2 are given number three seat, number two seat, number one seat, number four seat, and number five seat. The seats of inviters and invitees are shown in FIG. 5.

When an invitee invites his friend to watch the film, the seat distribution regulation is that a first preferentially distributed seat is given to the invitee who does not invite his friend, a second preferentially distributed seat is given to the invitee who invites his friend and belongs to best friend class, a third preferentially distributed seat is given to the invitee invited by an invitee belong to best friend class, a fourth preferentially distributed seat is given to the invitee who invites his friend and belongs to general friend class. A fifth preferentially distributed seat is given to the invitee invited by an invitee belonging to general friend class, and when the invitee is in a same priority level, a preferentially distributed seat is given to the invitee having talked more times to the inviter.

Figure 5:
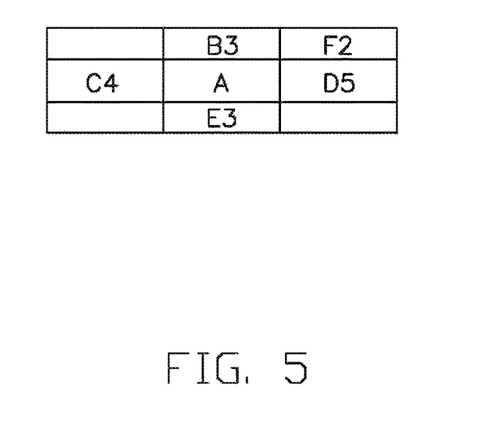
FIG. 5, with reference to FIG. 4, is a schematic diagram of seats of inviters and invitees.
Figure 6:
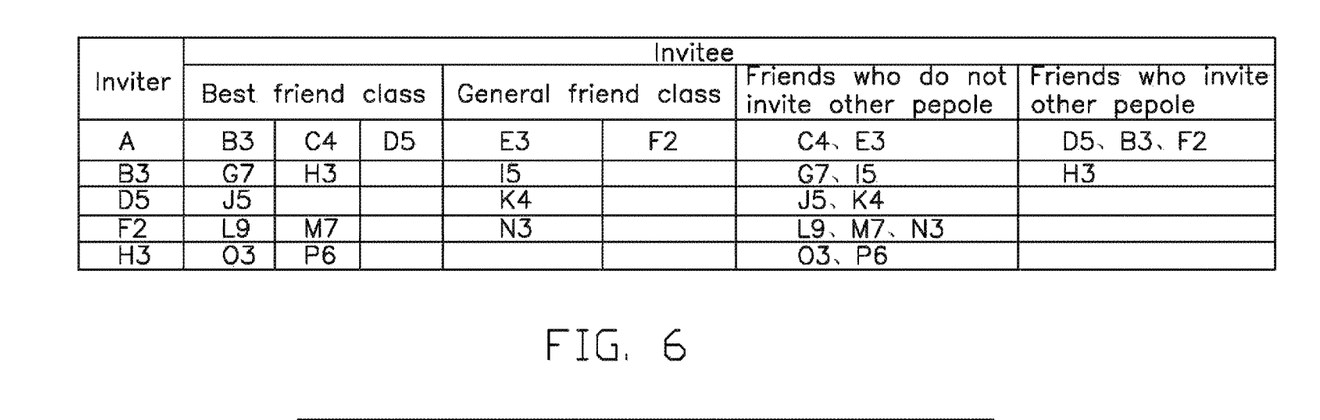
FIG. 6 is a schematic diagram of information of invitees in the system of FIG. 1, according to a second exemplary embodiment.

Referring to FIG. 5, invitees can invite his friends. In the embodiment, the inviter and the invitee who invites friends set a same priority of seats as shown in FIG. 3. In other embodiment, the inviter and the invitee who invite friends are set different priorities of seats. Referring to FIG. 6, the inviter A invites invitees C4, D5, E3, and F2 to watch film. The invitees C4 and E3 do not invite friends but the invitees B3, D5, and F2 do invite friends.

Figure 7:
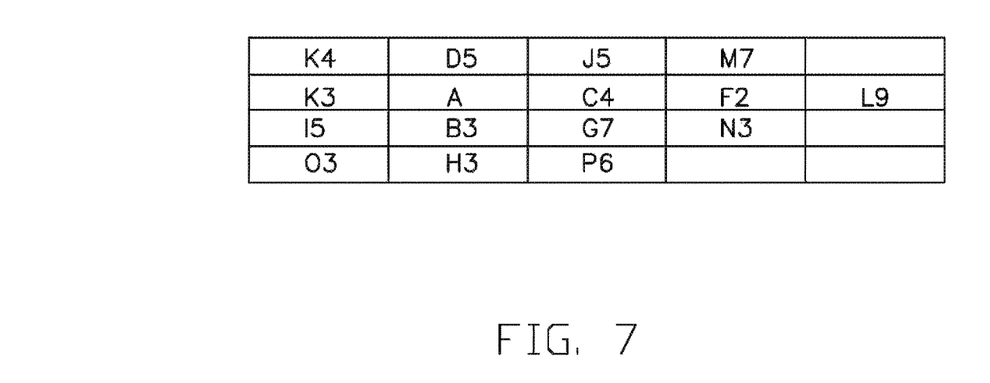
FIG. 7, referring to FIG. 6, is a schematic diagram of seats of inviters and invitees.

Referring to FIG. 7, when distributing seats, first, according to a preferential distribution of seats to the invitee who does not invite his friend, distributing seats to C4 and E3 who do not invite friends, and according to when the invitee is in a same priority level, preferentially distributing seats to the invitee having talked more times to the inviter, thus distributing number one seat to C4 and distributing number two seat to E3.

Second, according to a second preferential distribution of seats to the invitee who invites his friend and belongs to best friend class, distributing seats to D5 and B3, and according to when the invitee is in a same priority level, preferentially distributing seat to the invitee having talked more times to the inviter, thus distributing number three seat to D5 and distributing number four seat to B3.

Third, according to a third preferential distribution of seats to the invitee invited by an invitee belonging to best friend class and when the invitee is in a same priority level, preferentially distributing seat to the invitee having talked more times to the inviter, thus distributing seats to J5 and K4 who are invited by inviter D5 who is best friend of A to number one seat and number two seat of inviter D5. Seats are also distributed to G7, 15, H3 who are invited by inviter B3 who is best friend of A, to number one seat, number two seat, and number three seat of inviter B3. Number three seat of B3 has been distributed to other people and number four seat of inviter B3 distributed to H3.

Fourth, according to a fourth preferential distribution of seats to the invitee who invites his friend and belongs to general friend class, thus distributing seats to F2, because numbers one to eight seats have been distributed to other people, and number nine seat of inviter A distributed to F2.

Fifth, according to a fifth preferential distribution of seats to the invitee invited by an invitee belong to general friend class and when the invitee is in a same priority level, preferentially distributing seats to the invitee having talked more times talking to the inviter, thus distributing seats to L9, M7, and N3 who are invited by inviter F2 who is general friend of A, to number one seat, number two seat, and number three seat of inviter F2. Since number two seat of F2 has been distributed to C4, number one seat, number three seat, and number four seat of inviter F2 are distributed to L9, M7, and N3. Therefore, the inviter A, the invitees B3, C4, D5, E3, F2 invited by A, and the invitees G7, H3, 15, J5, K4, L9, M7, N3 invited by B3, D5, F2 have been given seats.

Finally, according to when the invitee is in a same priority level, preferentially distributing seats to the invitee having talked more times to the inviter, thus the invitees O3 and P6 invited by H3 are given number one seat and number two seat of H3. Therefore, seats are given to all of the people.

Furthermore, the seat setting module 54 provides a delete button on the seat setting interface, so that the inviter can delete or hide seats of invitees of a predetermined type. The predetermined type can be stranger invitees of the inviter and invitees whom the inviter does not want to see. Therefore, the inviter's viewing experience can be improved.

Figure 8:
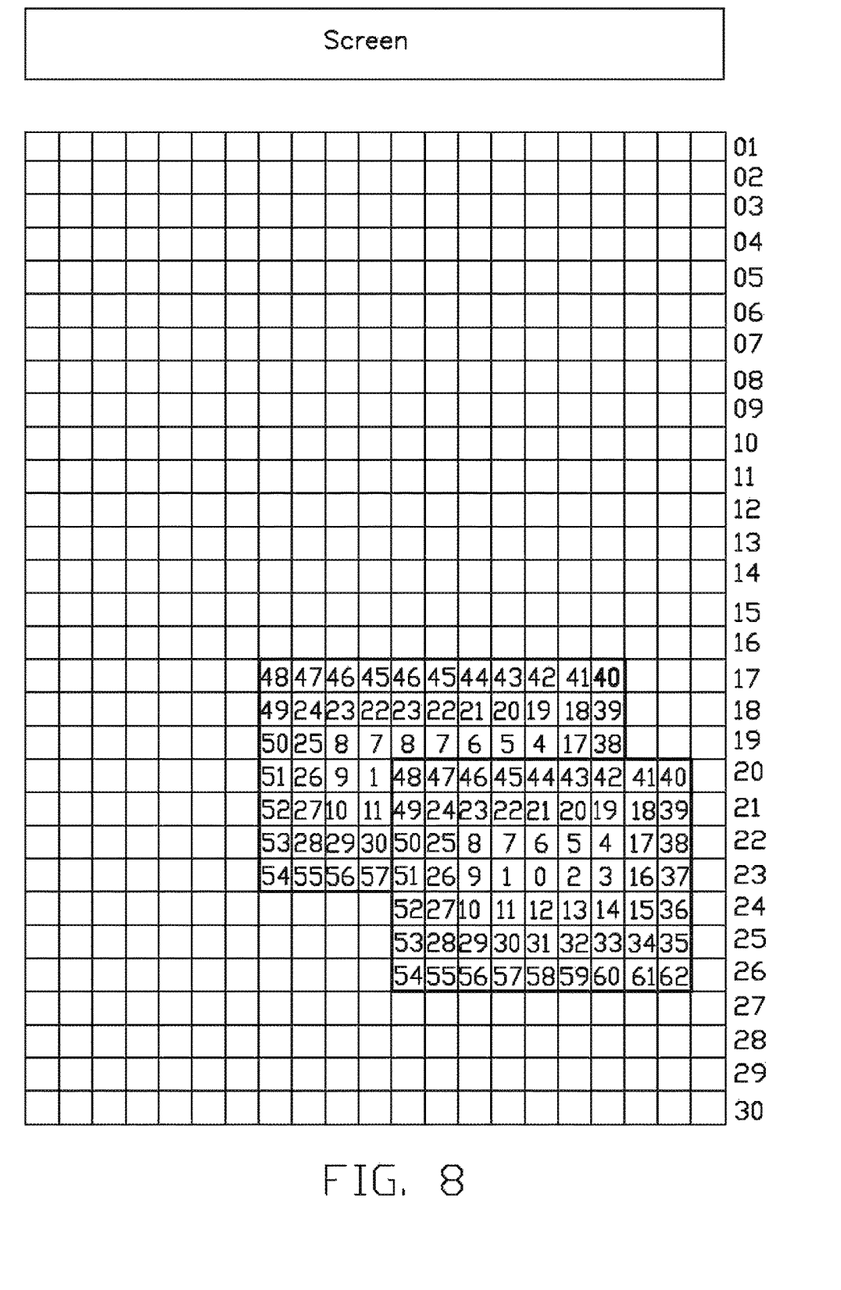
FIG. 8 is a schematic diagram of vision being adjusted in the system of FIG. 1.

Referring to FIG. 8, the vision adjusting module 59 keeps a relative position between the inviter's seat and the invitee's seat, and adjusts each people's seat to be a center seat of all the seats in the virtual cinema. Thus, the inviter and the invitees can all get a good view.

Further referring to FIG. 2, the virtual cinema interactive system 100 further includes a voice capturing module 60, a voice recognizing module 62, an action controlling module 64, and a voice processing module 28. The voice capturing module 60 captures a person's voice. The person can be the inviter or the invitee. The communicating module 50 transmits the information of the person and the captured voice to the server 20. In accordance with the information of the person, the server 20 transmits the captured voice to the friends of the person. The voice recognizing module 64 recognizes special noises, for example, applause, snoring, screaming, and so on. The action controlling module 64 controls virtual friend portraits to act corresponding to the special noise. For example, the voice recognizing module 64 recognizes applause and the action controlling module 64 controls that virtual friend portrait to clap his hands. According to the relative position between the person's seat and his friend's seat, the voice processing module 28 determines intensity of the voice or noise.

The virtual cinema interactive system 100 further includes talking object determining module 66. The voice recognizing module 62 further recognizes a name of a friend spoken by a voice. The talking object determining module 66 determines the person who has same name as the recognized name. The communicating module 50 transmits the determined target person to the server. The server 20 transmits the voice to the determined target person.

The virtual cinema interactive system 100 further includes a sensing module 68 and a cursor controlling module 70. The sensing module 68 senses a rotation of the person's head. The cursor controlling module 70 controls a cursor to move to a virtual friend portrait following the rotation of the person's head. When the cursor is kept on the virtual friend portrait for longer than a preset time, the talking object determining module 66 determines the person is talking to the friend corresponding to the portrait of the friend.

The server 20 further transmits the information of the person who is talking to the target person. The display module 46 displays the information of the person on a screen of the user terminal held by the target person. When the person's information is displayed on such screen, the target person can rotate his head to make the cursor move on the person's information to talk to the person. The person's information includes a picture of person's head.

The virtual cinema interactive system 100 further includes an image capturing device 80 and an image recognizing module 72. The capturing device 80 communicates with the user terminal 40. The image capturing device 80 captures a person's image and transmits the person image to corresponding user terminal 40. The person can be the inviter or the invitee. The image recognizing module 72 recognizes an action of the person. According to the action of the person, the action controlling module 64 controls the portrait to do corresponding action, for example, stretching or yawning.

After playing the film, the display module 46 displays a sharing icon. Following the rotation of the person's head, the cursor controlling module 70 controls the cursor to move on the sharing icon. In response to a sharing operation on the sharing icon, the action controlling module 64 controls the portrait to move before the film screen in a preset speed. The voice capturing module 60 captures the voice about reactions to the film. The communicating module 50 transmits the voice expressing feelings about the film to the server 20. The server 20 transmits such vocal expressions to the inviter and the invitee in the virtual cinema. Thus, the inviter and the invitee in the virtual cinema can hear the reaction of others to the film.

The virtual cinema interactive system 100 further includes a film processing module 30, a fragment determining module 32, and a fragment playing module 74. The film processing module 30 segments the film into a number of fragments and sets keywords for each fragment. The fragment determining module 32 determines the film fragment which has the keyword spoken by the person. The display module 46 displays the determined film fragment. Following the rotation of the person's head, the cursor controlling module 70 controls the cursor to move onto one or more of the determined film fragments. In response to spoken keyword, the film playing module 47 plays the one or more film fragments.

In the embodiment, the film providing module 22, the storage module 24, the seat distributing module 26, the voice processing module 28, the film processing module 30, and the fragment determining module 32 are executed in the server 20. The film selecting module 42, the cinema building module 44, the display module 46, the film playing module 47, the inviting module 48, the communicating module 50, the determining module 52, the film setting module 53, the seat setting module 54, the seat adjusting module 56, the virtual friend generating module 58, the vision adjusting module 59, the voice capturing module 60, the voice recognizing module 62, the action controlling module 64, the talking object determining module 66, the sensing module 68, the cursor controlling module 70, and the image recognizing module 72 are executed in the user terminal 40. In another embodiment, the storage module 24 and the seat distributing module 26 are also executed in the server 20.

Figure 9:
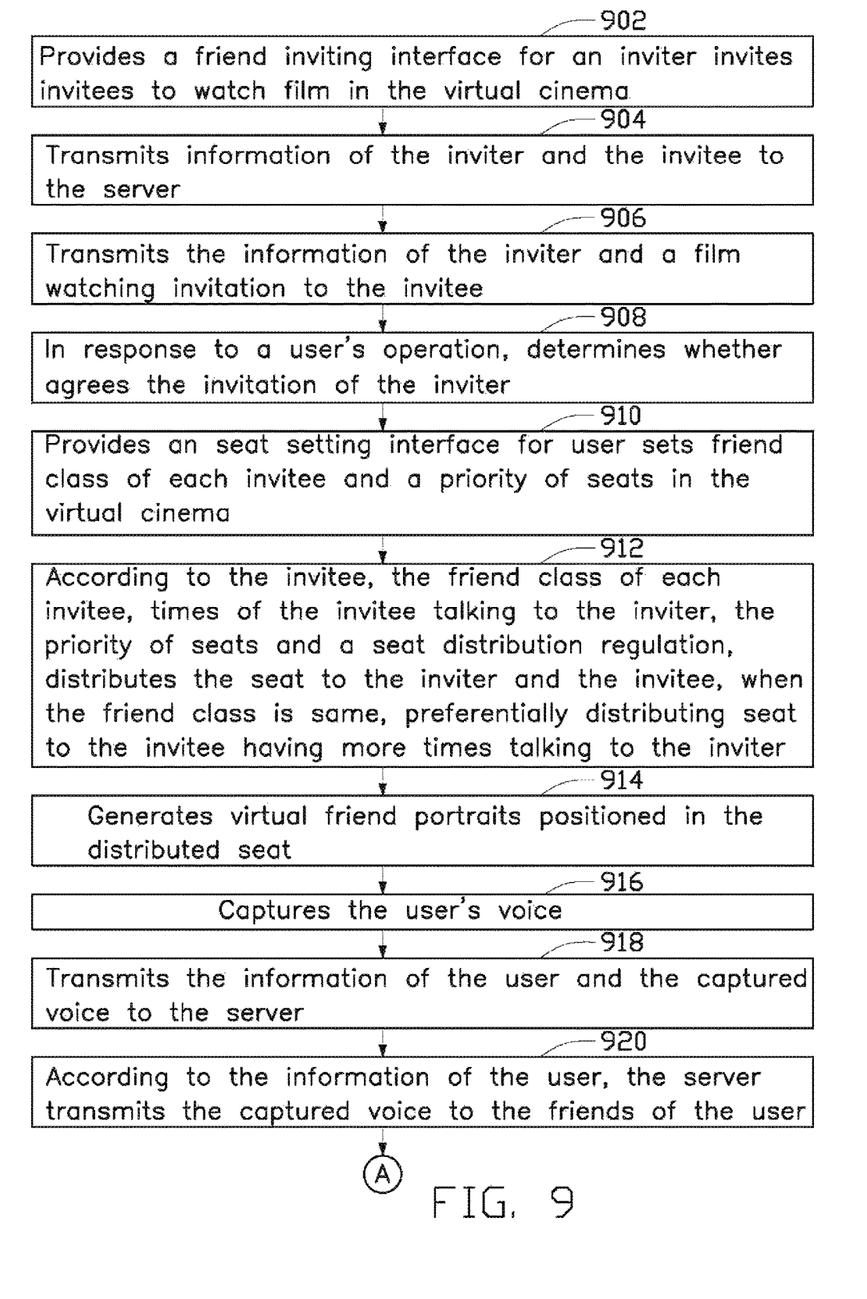
FIG. 9 is a flowchart of an exemplary virtual cinema interactive method.
Figure 10:
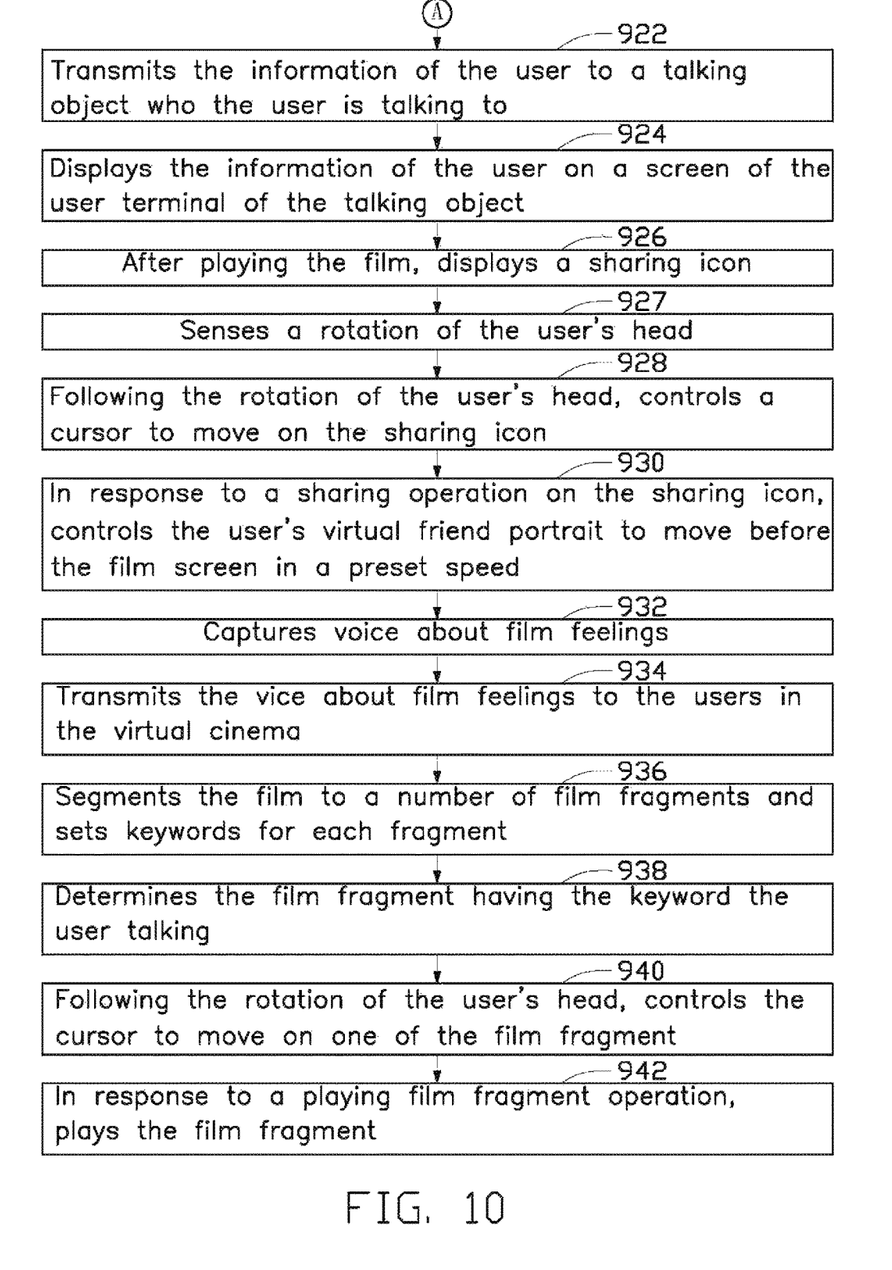
FIG. 10 is another flowchart of an exemplary virtual cinema interactive method.

FIGS. 9-10 illustrate a virtual cinema interactive method. The order of blocks in FIG. 9 is illustrative only and the order of the blocks can change. Additional blocks can be added or fewer blocks may be utilized without departing from this disclosure. The exemplary method begins at block 902.

At block 902, the inviting module 48 provides a friend invitation interface for an inviter invites invitees to watch film in the virtual cinema.

At block 904, the communicating module 50 transmits information of the inviter and the invitee to the server 20.

At block 906, the server 20 transmits the information of the inviter and a film watching invitation to the invitee.

At block 908, in response to an inviter's operation, the determining module 52 determines whether agrees the invitation of the inviter.

At block 910, the film setting module 53 provides an seat setting interface for the inviter sets friend class among the invitees and a priority of seats for each invitee in the virtual cinema.

At block 912, according to the invitee, the friend class of each invitee, number of chat communications made by the invitee to the inviter, the priority of seats and a seat distribution regulation, the seat distributing module 26 distributes the seat to the inviter and the invitee, when the friend class is same, preferentially seat distribution assigns seats to the invitee having communicated the most with to the inviter.

At block 914, the virtual friend generating module 58 generates virtual friend portraits positioned in the distributed seat.

At block 916, the voice capturing module 60 captures a person's voice, the person can be the inviter or the invitee.

At block 918, the communicating module 50 transmits the information of the person and the captured voice to the server 20.

At block 920, according to the information of the person, the server 20 transmits the captured voice to his friends.

At block 922, the server 20 transmits the information of the person to a talking object who the person is talking to.

At block 924, the display module 46 displays the information of the person on a screen of the user terminal 40 of the talking object.

At block 926, after playing the film, the display module 46 displays a sharing icon.

At block 927, the sensing module 68 senses a rotation of the person's head.

At block 928, following the rotation of the person's head, the cursor controlling module 70 controls a cursor to move on the sharing icon.

At block 930, in response to a sharing operation on the sharing icon, the action controlling module 64 controls the person's virtual friend portrait to move before the film screen in a preset speed.

At block 932, the voice capturing module 60 captures voice about film feelings.

At block 934, the server 20 transmits the voice about film feelings to the inviter and the invitee in the virtual cinema.

At block 936, the film processing module 30 segments the film to a number of film fragments and sets keywords for each fragment.

At block 938, the fragment determining module 32 determines the film fragment having the keyword the person talking.

At block 940, following the rotation of the person's head, the cursor controlling module 70 controls the cursor to move on one of the film fragment.

At block 942, in response to a playing film fragment operation, the film playing module 47 plays the film fragment.

The shown and described above are only examples. Even though numerous characteristics and advantages of the present disclosure have been set forth in the foregoing description, together with details of the structure and function of the present disclosure, the disclosure is illustrative only, and changes may be made in the detail, comprising in matters of shape, size, and arrangement of the parts within the principles of the present disclosure, up to the full extent established by the broad general meaning of the terms used in the claims.

What is claimed is:

1. A virtual cinema interactive system comprising:
a server;
at least two user terminals communicated to the server;
the server comprising:
at least one processor;
a non-transitory storage system coupled to the at least one processor and configured to store one or more programs to be executed by the at least one processor, the one or more programs including instructions for:
providing film information and film data;
building a virtual cinema, the virtual cinema comprising a film screen and a plurality of seats;
displaying the virtual cinema;
providing an invitation interface for an inviter to select invitees to join in watching the film;
transmitting information of the inviter and the invitee invited by the inviter to the server;
transmitting the information of the inviter and a film invitation to the invitee;
determining whether the invitee agrees to the invitation of the inviter in response to the invitee's operation;
providing a seat setting interface for the inviter to set a class of friend in relation to each invitee and a priority of seats in the virtual cinema, wherein a delete button is provided on the seat setting interface, the inviter can delete or hide seats of invitees of a predetermined type;
storing times of the invitee talking to the inviter;
distributing the seat to the inviter and the invitee according to: the invitee, the class of friend in relation to each invitee, the times, the priority of seats and a seat distribution regulation;
generating virtual friend portraits positioned in the distributed seat;
wherein after agreeing to the invitation, the invitee also can invite his friends and sets classes of friends and his priority of seats in the virtual cinema; and
wherein the class of friend comprises a best friend class and a general friend class, when an invitee invites his friend to watch the film, the seat distribution regulation is that a first preferentially distributing seat to the invitee who does not invite his friend, a second preferentially distributing seat to the invitee who invites his friend and belongs to best friend class, a third preferentially distributing seat to the invitee invited by an invitee belong to best friend class, a fourth preferentially distributing seat to the invitee who invites his friend and belongs to general friend class, a fifth preferentially distributing seat to the invitee invited by an invitee belong to general friend class, and when the invitee is in a same priority level, preferentially distributing seat to the invitee having more times talking to the inviter.

2. The virtual cinema interactive system as claimed in claim 1, wherein when none of the invitees invites his friend to watch the film, the seat distribution regulation is that of preferentially distributing of seat to the invitee having a higher ranking of the class of friend, and when the class of friend is same, preferentially distributing seat to the invitee having more times talking to the inviter.

3. The virtual cinema interactive system as claimed in claim 2, wherein all of the inviters set a same priority of seats.

4. The virtual cinema interactive system as claimed in claim 1, wherein the non-transitory storage system is further configured to provide a film setting interface for inviter to set a playing time of the selected film, the server transmits the playing time of the selected film to the invitee.

5. The virtual cinema interactive system as claimed in claim 1, wherein the playing time is adjustable through the film setting interface.

6. The virtual cinema interactive system as claimed in claim 1, wherein the non-transitory storage system is further configured to transmit the information of the selected film to the server, the server further transmits the information of the selected film to the invitee.

7. The virtual cinema interactive system as claimed in claim 1, wherein the non-transitory storage system is further configured to keep a relative position between the inviter's seat and the invitee's seat, and adjusts each person's seat to a center seat of the seats in the virtual cinema.

8. The virtual cinema interactive system as claimed in claim 1, wherein the non-transitory storage system is further configured to capture a person's voice, the person is the inviter or the invitee, transmit the information of the person and the captured voice to the server, according to the information of the person, transmit the captured voice to the friends of the person.

9. The virtual cinema interactive system as claimed in claim 6, wherein the non-transitory storage system is further configured to recognize special voice, control corresponding virtual friend portrait to do action corresponding to the special voice.

10. The virtual cinema interactive system as claimed in claim 9, wherein the special voice is applause, the non-transitory storage system is further configured to control corresponding virtual friend portrait to clap his hands.

11. The virtual cinema interactive system as claimed in claim 8, wherein the non-transitory storage system is further configured to sense a rotation of the person's head, control a cursor to move on a virtual friend portrait following the rotation of the person's head, when duration of the cursor keeps on the virtual friend portrait longer than a preset time, determine the person will talks to a talking object corresponding to the virtual friend portrait, the server transmits the voice to the talking object.

12. The virtual cinema interactive system as claimed in claim 8, wherein the non-transitory storage system is further configured to play the film, after playing the film, display a sharing icon, follow the rotation of the person's head, control the cursor to move on the sharing icon, in response to a sharing operation on the sharing icon, control the person's virtual friend portrait to move before the film screen in a preset speed, capture the voice about film feelings, transmit the voice about film feelings to the server, the server transmits the voice about film feelings to the inviter and the invitee in the virtual cinema.

13. The virtual cinema interactive system as claimed in claim 12, wherein the non-transitory storage system is further configured to segment the film to a number of film fragments and set keywords for each fragment, determine the film fragment having the keyword the person talking, display the determine film fragment, follow the rotation of the person's head, control the cursor to move on one of the determined film fragment, in response to a playing film fragment operation, play the film fragment.

14. A virtual cinema interactive method comprising:
providing a friend invitation interface for an inviter to select friends to watch the film together;
transmitting information of the inviter and a film watching invitation to the invitee;
in response to a user's operation, the invitee deciding to accept or not accept the invitation of the inviter;
providing a seat setting interface for the inviter to set a class of friend in relation to each invitee and a priority of seats in the virtual cinema, wherein a delete button is provided on the seat setting interface, the inviter can delete or hide seats of invitees of a predetermined type;
according to: the invitee, the class of friend in relation to each invitee, times of the invitee talking to the inviter, the priority of seats and a seat distribution regulation, distributing the seat to the inviter and the invitee,
wherein the seat distribution regulation comprises when the class of friend is same, preferentially distributing seat to the invitee having more times talking to the inviter;
generating virtual friend portraits positioned in the distributed seat;
wherein after accepting to the invitation, the invitee also can invite his friends and sets classes of friends and his priority of seats in the virtual cinema; and wherein the class of friend comprises a best friend class and a general friend class, when an invitee invites his friend to watch the film, the seat distribution regulation is that a first preferentially distributing seat to the invitee who does not invite his friend, a second preferentially distributing seat to the invitee who invites his friend and belongs to best friend class, a third preferentially distributing seat to the invitee invited by an invitee belong to best friend class, a fourth preferentially distributing seat to the invitee who invites his friend and belongs to general friend class, a fifth preferentially distributing seat to the invitee invited by an invitee belong to general friend class, and when the invitee is in a same priority level, preferentially distributing seat to the invitee having more times talking to the inviter.

15. The virtual cinema interactive method as claimed in claim 14, further comprising:
capturing the person's voice; and
transmitting the captured voice to the friends of the person.

16. The virtual cinema interactive method as claimed in claim 15, further comprising:
transmitting the information of the person to a talking object who the person is talking to; and
displaying the information of the person.

17. The virtual cinema interactive method as claimed in claim 14, further comprising:
after playing the film, displaying a sharing icon;
sensing a rotation of the person's head;
following the rotation of the person's head, controlling a cursor to move on the sharing icon;
in response to a sharing operation on the sharing icon, controlling the person's virtual friend portrait to move before the film screen in a preset speed;
capturing voice about film feelings; and
transmitting the voice about film feelings to the inviter and the invitee in the virtual cinema.

18. The virtual cinema interactive method as claimed in claim 17, further comprising:
segmenting the film to a number of film fragments and sets keywords for each fragment;
determining the film fragment having the keyword the person talking;
following the rotation of the person's head, controlling the cursor to move on one of the film fragment;
in response to a playing film fragment operation, playing the film fragment.

* * * * *